Patented May 3, 1938

2,116,034

UNITED STATES PATENT OFFICE 2,116,034

COMPOUNDS AND PROCESSES FOR CLEANING MOLDS

Carver N. McGaughey, Clarksburg, W. Va.

No Drawing. Application August 17, 1936, Serial No. 96,551

2 Claims. (Cl. 148—8)

This invention relates to an improved compound and process more particularly adapted for use in the cleaning of molds used in the glass industry.

In the manufacture of many glass products, the use of molds is required and these molds are operated at a very high temperature. As the molds are ordinarily made of iron, portions of iron from the molds combine with oxygen present in the molds or in the oil that is sprayed into the molds, thereby producing iron oxides. When these iron oxides, together with carbon deposits from the oil, are allowed to accumulate, they finally produce a thick coating which renders further use of the molds impossible until this deposit has been removed. Up to the present time, the common method used for cleaning glass molds of this deposit is to rub out the molds with abrasive stones, beginning with a coarse grade of abrasive and repeatedly changing the grade until a fine abrasive is used for giving a smooth finish to the interior of the molds. This method, while effective, has the serious fault that the material of the molds is partly removed, together with the deposit. It will, therefore, be readily understood that repeated cleaning operations in accordance with this method, will render the molds useless. As molds are expensive, it is obvious that such a system is very unsatisfactory and costly. Another method, which comprises the use of acids, has been employed, but the acids attack the molds and damage them. Furthermore, the use of acids is dangerous to the workers.

Therefore, one object of my invention is to provide a compound and process for cleaning molds of the type mentioned, which may be employed for effectually cleaning said molds without injury to the molds and without danger to the workers.

Another object of my invention is to provide a compound and process of this character which will permit the cleaning of the molds in the shortest possible time without injury thereto and in a manner which will be complete in its action.

A further object of the invention is to provide an improved compound and process for cleaning molds, the ingredients of the compound of which may be varied so that the speed of cleaning the molds may be likewise varied to suit conditions.

Other objects of my invention will render themselves apparent as the description proceeds.

The compound I employ for cleaning molds comprises a mixture of stannous chloride and water acidulated with tartaric acid. In order to prepare a given amount of the compound, I dissolve five pounds of stannous chloride in one gallon of water, which water has been acidulated with one-quarter ounce of tartaric acid. It should be understood that I do not limit myself to these particular proportions as any suitable proportions of the ingredients may be employed. The purpose of the stannous chloride is to reduce the oxides of iron which, as stated, form as a deposit on the mold while in use, while the purpose of the tartaric acid is to slightly acidulate the water for producing a suitable solvent for the stannous chloride.

The stannous chloride acts as a strong reducing agent which will reduce the oxides of iron which so tenaciously adhere to the mold. The tin, in combination with chlorine, comprising the stannous chloride, gives out two electrons which are taken in by the iron in the mold which, in turn, releases the oxygen. The result is a soft black slime within the mold which slime is composed of carbon and iron and which may be readily wiped off. It is pointed out that the stannous chloride is dissolved in water which has been acidulated with a very small quantity of tartaric acid. Only enough of the tartaric acid is used to give the water an acid characteristic. It is further pointed out that the small amount of tartaric acid in no way enters into the cleaning process but is necessary for producing a suitable solvent for the stannous chloride. The strength of the solution of my improved compound will depend upon how fast the worker wants the cleaning done. If desired, the solution may be saturated with stannous chloride, which would work very rapidly, as it is safe to use in any desired strength. It is desirable that the solution be heated previous to a cleaning operation as it has been found that the solution will work faster and to better advantage while warm.

In the use of this compound, I have found the stannous chloride, in a weak solution, forms a light precipitate. In order to retard this precipitate, or reverse the action, it is only necessary to introduce into the solution a very small quantity of the characteristic acid of the particular salt precipitate. In the case of stannous chloride and tartaric acid, the acid would be hydrochloric. The addition of this acid may or may not be required, depending upon individual cases, and the use thereof is left entirely to the discretion of the worker. It will be understood, of course, that as the compound is used repeatedly, its effectiveness will be lessened so that it will be necessary to add fresh portions from time to time. After a certain number of cleaning operations, it will be found to be more economical to renew the compound entirely.

As stated hereinbefore, exhaustive research has shown that, in between the carbon coating deposited on the molds in the manner described, and the molds themselves, there was, with no exception, a very thin layer of oxides of iron. It was also found that this layer acted as a binder, or cement, for the carbon. It was further observed that if the iron oxides were reduced, the black deposit could be much more easily removed. The problem, which I have solved, was to find a reducing agent which would reduce these oxides and not attack the iron of the mold itself. The stannous chloride solution fulfills the requirement completely. However, there are other reducing agents which may be employed and I wish to call attention to the fact that I do not desire to limit myself to any particular reducing agent. The stannous chloride has proven to be the most practical in tests conducted so far.

In order to clean out a mold, it is only necessary to apply the solution to the mold and allow it to act upon the surface thereof for a short time. The addition of tin to the compound will sometimes be found to be beneficial. After the compound has acted upon the carbon deposit in the mold a sufficient length of time, said deposit will become soft and slimy so that it may be readily wiped out and the mold rinsed in warm water to remove any stray particles. By the use of this compound and process, abrasive action on the face of the mold, with consequent destruction and wear thereof will be avoided. The process is very speedy and the usual time and labor employed by the abrasive method will not be necessary. Furthermore, the strength of the compound may be varied for speeding up or slowing down the cleaning operation. The effect of the compound within the mold will be uniform throughout so that unevenness in the mold will not occur. A further advantage for the use of my compound and process is that it may be employed with absolute safety to the workers and with complete success on the molds.

It is believed that from the foregoing it will be seen that I have provided a highly efficient compound and process for the cleaning of molds used in the glass industry.

Having thus described my new compound and process, I claim:

1. A composition of matter for cleaning molds used for making glassware comprising a solution of stannous chloride and water acidulated with tartaric acid, said tartaric acid providing a solvent for said stannous chloride and said stannous chloride defining a reducing agent for reducing iron oxide deposits within the molds.

2. The method of cleaning a mold used in the manufacture of glassware comprising the step of placing a solution of stannous chloride, water, and tartaric acid within the mold, and allowing the compound to act on oxides within the mold and produce an emulsion of reduced oxides and extraneous matter.

CARVER N. McGAUGHEY.